(12) United States Patent
Terada et al.

(10) Patent No.: US 11,691,697 B2
(45) Date of Patent: Jul. 4, 2023

(54) MARINE VESSEL AND MARINE VESSEL IMAGING DEVICE

(71) Applicant: YAMAHA HATSUDOKI KABUSHIKI KAISHA, Iwata (JP)

(72) Inventors: Kohei Terada, Shizuoka (JP);
Hirofumi Amma, Shizuoka (JP);
Yoshimasa Kinoshita, Shizuoka (JP);
Shimpei Fukumoto, Osaka (JP);
Mitsuaki Kurokawa, Osaka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 376 days.

(21) Appl. No.: 16/812,477

(22) Filed: Mar. 9, 2020

(65) Prior Publication Data
US 2020/0298942 A1 Sep. 24, 2020

(30) Foreign Application Priority Data
Mar. 19, 2019 (JP) .................................. 2019-051057

(51) Int. Cl.
| | |
|---|---|
| *B63B 49/00* | (2006.01) |
| *G06V 20/13* | (2022.01) |
| *B63B 45/04* | (2006.01) |
| *F21W 107/20* | (2018.01) |
| *G03B 15/06* | (2021.01) |
| *F21V 1/00* | (2006.01) |

(52) U.S. Cl.
CPC .............. *B63B 45/04* (2013.01); *B63B 49/00* (2013.01); *F21V 1/00* (2013.01); *F21W 2107/20* (2018.01); *G03B 15/06* (2013.01)

(58) Field of Classification Search
CPC .......... B63B 45/00; B63B 45/02; B63B 45/04; B63B 45/06; B63B 49/00; B63B 2201/04; B63B 2201/08; G06B 20/13; G03B 15/06; G03B 15/07; F21W 2107/20; F21V 1/00; F21V 23/0442; F21V 23/0471; G06V 20/13
See application file for complete search history.

(56) References Cited

U.S. PATENT DOCUMENTS 7,677,772 B1 * 3/2010 Wolske ................... B63B 45/00
362/477
10,312,706 B2 * 6/2019 Corley .................. H02J 7/0042
(Continued)

FOREIGN PATENT DOCUMENTS

| CN | 104075204 A | 10/2014 |
|---|---|---|
| CN | 204871490 U | 12/2015 |

(Continued)

OTHER PUBLICATIONS

Kimura Koyu et al., "Method of Reducing Wind Pressure Resistance", Oct. 22, 2009, J-Plat Pat (English translation of) JP,2009-241902,A, pp. 1-21.*

(Continued)

*Primary Examiner* — Alan B Cariaso
(74) *Attorney, Agent, or Firm* — Keating and Bennett, LLP

(57) ABSTRACT

A marine vessel includes a vessel body including a navigation light, an imager provided in a vicinity of or adjacent to the navigation light, and a light shield provided between the navigation light and the imager so as to block light from the navigation light to the imager.

20 Claims, 3 Drawing Sheets

(56) References Cited

U.S. PATENT DOCUMENTS

| | | | |
|---|---|---|---|
| 2006/0250269 A1* | 11/2006 | Wang | H05B 45/22 340/815.45 |
| 2010/0225761 A1 | 9/2010 | Ishii | |
| 2019/0239326 A1 | 8/2019 | Yoneda et al. | |

FOREIGN PATENT DOCUMENTS

| | | | | |
|---|---|---|---|---|
| CN | 106741648 A | * | 5/2017 | ............ B63B 22/00 |
| EP | 1914992 A1 | * | 4/2008 | ............ B63B 35/00 |
| JP | 2009-241902 A | | 10/2009 | |
| JP | 2010-041530 A | | 2/2010 | |
| JP | 2016-082586 A | | 5/2016 | |
| JP | 2017-068160 A | | 4/2017 | |
| JP | 2017-121832 A | | 7/2017 | |
| JP | 2018-098092 A | | 6/2018 | |
| KR | 10-2017-0125701 A | | 11/2017 | |
| TW | I519731 B | | 2/2016 | |
| WO | WO-2010016340 A1 | * | 2/2010 | ............ B63B 49/00 |
| WO | 2017/167902 A1 | | 10/2017 | |

OTHER PUBLICATIONS

Kamei Kentaro et al., "Illuminating Fixture, Image Data Acquisition Systems, and Image Data Acquisition Method", Apr. 6, 2017, J-Plat Pat (English translation of) JP,2017-068160,A, pp. 1-29.*

Ishii Yohei, "Steering Supporting Device", Feb. 18, 2019, J-Plat Pat (English translation of) JP,2010-041530,A, pp. 1-34.*

Official Communication issued in corresponding Japaanese Patent Application No. 2019-051057, dated Dec. 6, 2022.

Shima, "A marine monitoring instrument", Journal of Fishing Boat and System Engineering Association of Japn, vol. 3, No. 27, Nov. 10, 2003, 7 pages.

* cited by examiner

MARINE VESSEL AND MARINE VESSEL IMAGING DEVICE

CROSS REFERENCE TO RELATED APPLICATIONS

This application claims the benefit of priority to Japanese Patent Application No. 2019-051057 filed on Mar. 19, 2019. The entire contents of this application are hereby incorporated herein by reference.

BACKGROUND OF THE INVENTION

1. Field of the Invention

The present invention relates to a marine vessel and a marine vessel imaging device.

2. Description of the Related Art

A marine vessel including an imager is known in general. Such a marine vessel is disclosed in Chinese Utility Model No. 204871490, for example.

Chinese Utility Model No. 204871490 discloses a marine vessel including an imager and an illuminator. The imager and the illuminator are both attached to an upper portion of a mast. That is, the imager is provided in the vicinity of the illuminator. When the imager is provided in the vicinity of the illuminator, power is easily supplied, to the imager, from a power source of power supplied to the illuminator.

However, in the marine vessel described in Chinese Utility Model No. 204871490, when the imager is provided in the vicinity of the illuminator, light of the illuminator appears in an image captured by the imager, which adversely affects the image. Although not explicitly described in Chinese Utility Model No. 204871490, the imager is conceivably provided in the vicinity of a navigation light. However, even in such a case, when the imager is provided in the vicinity of the navigation light, light from the navigation light appears in the image captured by the imager, and the image may be adversely affected.

SUMMARY OF THE INVENTION

Preferred embodiments of the present invention provide marine vessels and marine vessel imaging devices that significantly reduce or prevent the appearance of light from navigation lights in images captured by imagers.

A marine vessel according to a preferred embodiment of the present invention includes a vessel body including a navigation light, an imager provided in a vicinity of or adjacent to the navigation light, and a light shield provided between the navigation light and the imager so as to block light from the navigation light to the imager.

In a marine vessel according to a preferred embodiment of the present invention, with the structure described above, the light from the navigation light toward the imager is blocked by the light shield, and thus the appearance of light from the navigation light in an image captured by the imager is significantly reduced or prevented. Furthermore, the imager is provided in the vicinity of or adjacent to the navigation light, and thus power is also supplied to the imager by wiring that supplies power to the navigation light. That is, the wiring is shared, and thus the structure (the structure of the wiring) that supplies power is simplified.

In a marine vessel according to a preferred embodiment of the present invention, the imager is preferably provided at a position that overlaps the light shield in an upward-downward direction. Accordingly, a space in which the imager and the light shield are provided in a horizontal direction is reduced.

In such a case, the light shield is preferably provided at a position that overlaps the imager and the navigation light in a plan view. Accordingly, a space in which the imager, the light shield, and the navigation light are provided in the horizontal direction is reduced. Furthermore, the navigation light emits light substantially in the horizontal direction, and thus the imager and the navigation light overlap each other in the plan view such that the appearance of light from the navigation light in the image captured by the imager is significantly reduced or prevented.

A marine vessel in which the imager is provided at the position that overlaps the light shield in the upward-downward direction preferably further includes a navigation light mounting pole to which the navigation light is attached, the navigation light mounting pole extending in the upward-downward direction, and the imager and the light shield are preferably attached to the navigation light mounting pole above or below the navigation light. Accordingly, the imager and the navigation light are attached to the common navigation light mounting pole such that the imager is easily provided in the vicinity of or adjacent to the navigation light.

In such a case, the navigation light mounting pole preferably includes a mast light mounting pole to which a mast light of the navigation light is attached, the mast light mounting pole being provided at an upper portion of the vessel body, the light shield is preferably attached to the mast light mounting pole above the mast light, and the imager is preferably attached to the mast light mounting pole above the mast light. Accordingly, the imager is attached to the mast light mounting pole provided at the highest position of the marine vessel, and thus a wider range is imaged by the imager.

In a marine vessel in which the imager is attached to the mast light mounting pole above the mast light, the imager is preferably attached to the mast light mounting pole above the light shield such that an image captured by the imager does not include the light shield. Accordingly, an image of the surroundings of the marine vessel to be imaged is reliably captured over a wider range without being obstructed by the light shield.

In a marine vessel including the navigation light mounting pole, the imager preferably includes a single all-around imager that images an entire or substantially an entire circumference around the vessel body. Accordingly, the structure of the device is simplified as compared with a case in which a plurality of imagers image the entire or substantially the entire circumference around the vessel body.

In a marine vessel including the navigation light mounting pole, the light shield preferably has a disk shape that extends in a horizontal direction around the navigation light mounting pole. Accordingly, a distance from the navigation light to the outer peripheral end of the light shield is uniform, and thus the light shield uniformly blocks light in any horizontal direction.

In such a case, in a plan view, a diameter of the light shield is preferably larger than a diameter of the navigation light. Accordingly, the light shield and the navigation light reliably overlap each other in the upward-downward direction, and thus light is more reliably blocked by the light shield.

In a marine vessel in which the imager is provided at the position that overlaps the light shield in the upward-downward direction, the light shield is preferably attached below a port light and a starboard light of the navigation light, and the imager is preferably attached below the light shield. Accordingly, images in leftward and rightward directions in which a blind spot of the imager is likely to occur are reliably acquired without being obstructed by the light shield.

In a marine vessel in which the imager is provided at the position that overlaps the light shield in the upward-downward direction, the imager preferably includes a plurality of outer circumference imagers that image surroundings of the vessel body, the plurality of outer circumference imagers preferably do not image a same target, and in a horizontal direction, a sum of angles of views of the plurality of outer circumference imagers is preferably about 360 degrees. In general, when the surroundings of a marine vessel are imaged by a plurality of imagers and a composite image is created, it is necessary to perform calibration in order to match the overlapping of the captured images of the plurality of imagers. With the structure described above, the plurality of outer circumference imagers capture images of about 360 degrees around the marine vessel without overlapping each other, and thus a composite image of the entire or substantially the entire circumference around the marine vessel is easily acquired without performing calibration.

In a marine vessel according to a preferred embodiment of the present invention, the imager preferably includes two outer circumference imagers, an angle of view of each of the two outer circumference imagers is preferably about 180 degrees in the horizontal direction, and the two outer circumference imagers are preferably disposed to capture images in horizontally opposite directions. Accordingly, a blind spot of one of the two outer circumference imagers is reliably covered by the other of the two outer circumference imagers.

In a marine vessel according to a preferred embodiment of the present invention, the two outer circumference imagers preferably include a first outer circumference imager and a second outer circumference imager that captures an image in the horizontal direction opposite to that of the first outer circumference imager, the first outer circumference imager is preferably provided in a vicinity of or adjacent to a port light of the navigation light to capture an image in a leftward direction, or provided in a vicinity of or adjacent to a bow light of the navigation light to capture an image in a forward direction, and the second outer circumference imager is preferably provided in a vicinity of or adjacent to a starboard light of the navigation light to capture an image in a rightward direction when the first outer circumference imager is provided in the vicinity of or adjacent to the port light, and provided in a vicinity of or adjacent to a stern light of the navigation light to capture an image in a rearward direction when the first outer circumference imager is provided in the vicinity of or adjacent to the bow light. Accordingly, when the first outer circumference imager is provided in the vicinity of or adjacent to the port light and the second outer circumference imager is provided in the vicinity of or adjacent to the starboard light, the occurrence of blind spots of the marine vessel in the leftward direction and the rightward direction is significantly reduced or prevented. When the first outer circumference imager is provided in the vicinity of or adjacent to the bow light and the second outer circumference imager is provided in the vicinity of or adjacent to the stern light, the occurrence of blind spots of the marine vessel in a forward direction and a rearward direction is significantly reduced or prevented.

A marine vessel according to a preferred embodiment of the present invention preferably further includes power supply wiring that supplies power to the navigation light, and the power supply wiring preferably also supplies power to the imager. Accordingly, the power supply wiring supplies power not only to the navigation light but also to the imager. Therefore, the structure (the structure of the wiring) that supplies power is simplified as compared with a case in which dedicated wiring that supplies power to the imager is provided.

In a marine vessel according to a preferred embodiment of the present invention, the light shield and the navigation light are preferably separate from each other. Accordingly, the arrangement of the light shield with respect to the navigation light is adjusted.

In a marine vessel according to a preferred embodiment of the present invention, an upper surface of the light shield preferably includes an inclined surface that is inclined downward toward an end of the upper surface such that water does not accumulate thereon. Accordingly, adhesion of water to the imager that has accumulated on the upper surface of the light shield is significantly reduced or prevented.

In a marine vessel according to a preferred embodiment of the present invention, the light shield is preferably provided closer to the navigation light than the imager. Accordingly, the spreading of light emitted from the navigation light toward the imager is effectively significantly reduced or prevented.

In such a case, the light shield preferably contacts the navigation light and is preferably spaced apart from the imager. Accordingly, the spreading of light emitted from the navigation light toward the imager is more effectively significantly reduced or prevented.

In a marine vessel according to a preferred embodiment of the present invention, the imager is preferably provided at a position higher than a vicinity of a bow light of the navigation light. Accordingly, the imager is provided at a relatively high position, and thus a wide range is imaged by the imager.

In a marine vessel according to a preferred embodiment of the present invention, the light shield preferably includes a plate-shaped light-shielding plate. Accordingly, the light from the navigation light toward the imager is blocked by a simple structure.

A marine vessel imaging device according to a preferred embodiment of the present invention includes an imager provided in a vicinity of or adjacent to a navigation light provided in a vessel body, and a light shield provided between the navigation light and the imager so as to block light from the navigation light to the imager.

In a marine vessel imaging device according to a preferred embodiment of the present invention, with the structure described above, the appearance of light from the navigation light in an image captured by the imager is significantly reduced or prevented, similarly to the marine vessels according to preferred embodiments of the present invention described above. Furthermore, a structure (the structure of wiring) that supplies power is simplified.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 100 according to a first preferred embodiment of the present invention is now described with reference to FIGS. 1 to 4. The marine vessel 100 is a small marine vessel, for example.

Figure 1:
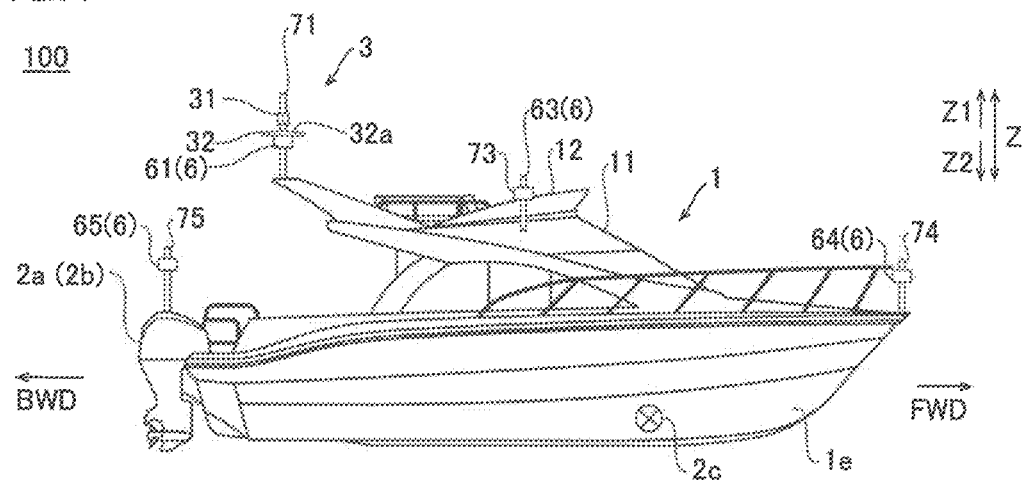
FIG. 1 is a side view showing a marine vessel according to a first preferred embodiment of the present invention.
Figure 2:
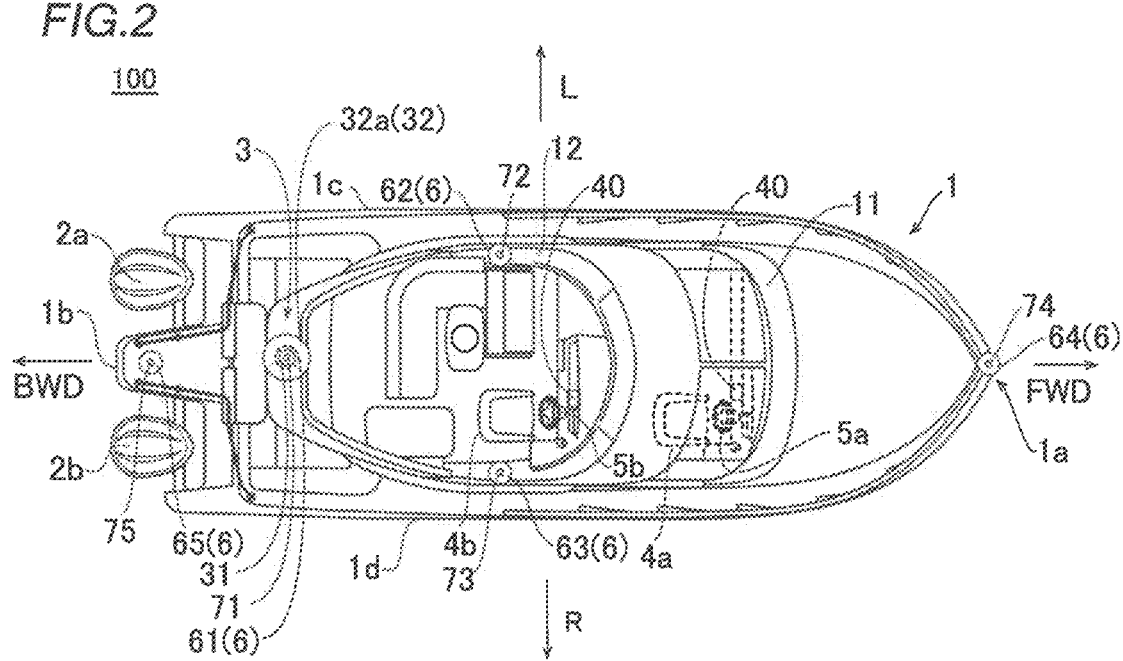
FIG. 2 is a plan view showing the marine vessel according to the first preferred embodiment of the present invention.

As shown in FIG. 1, the marine vessel 100 includes a vessel body 1 including navigation lights 6, propulsion devices 2a and 2b, a side thruster 2c, and a marine vessel imaging device 3. The vessel body 1 includes a cabin 11 at its upper portion and a bridge 12 at an upper portion of the cabin 11. As shown in FIG. 2, an operation seat 4a and a marine vessel operation unit 5a provided in the vicinity of the operation seat 4a are provided inside the cabin 11. An operation seat 4b and a marine vessel operation unit 5b provided in the vicinity of the operation seat 4b are provided in the bridge 12. The operation seat 4a and the operation seat 4b have the same structure. The marine vessel operation unit 5a and the marine vessel operation unit 5b have the same structure.

In this specification, the term "front (forward)" refers to a direction indicated by "FWD" in the figures and the forward movement direction (the bow 1a side of the vessel body 1) of the marine vessel 100. The term "rear (rearward)" refers to a direction indicated by "BWD" in the figures and the reverse movement direction (the stern 1b side of the vessel body 1) of the marine vessel 100. Furthermore, the term "left (leftward)" refers to a direction indicated by "L" in the figures and the port 1c side of the vessel body 1. The term "right (rightward)" refers to a direction indicated by "R" in the figures and the starboard 1d side of the vessel body 1. The term "vertically" refers to a direction indicated by "Z" in FIG. 1. The term "upper (upward, above)" refers to a direction indicated by "Z1" in FIG. 1, and the term "lower (downward, below)" refers to a direction indicated by "Z2" in FIG. 1.

The propulsion devices 2a and 2b are outboard motors, for example. As shown in FIG. 2, the propulsion device 2a is attached to a left portion of the stern 1b. The propulsion device 2b is attached to a right portion of the stern 1b. The side thruster 2c is attached to a vertically lower portion (see FIG. 1) of a hull 1e of the vessel body 1, for example. The marine vessel 100 is movable and turnable in forward, rearward, leftward, and rightward directions by the propulsion forces of the propulsion devices 2a and 2b and the side thruster 2c.

The marine vessel operation units 5a and 5b each include a steering operator, a remote control, and a joystick, for example. The marine vessel operation units 5a and 5b change the orientations and propulsion forces of the propulsion devices 2a and 2b and change the propulsion force generation direction and propulsion force of the side thruster 2c based on operations performed by a marine vessel operator.

The navigation lights 6 each have a cylindrical outer shape, and emit light in a predetermined angular range in a horizontal or substantially horizontal direction defined by a rule regarding the marine vessel 100. The navigation lights 6 include, for example, a mast light 61 (a rear mast light), a port light 62, a starboard light 63, a bow light 64 (a front mast light), and a stern light 65. The navigation lights 6 are able to notify another marine vessel of the presence and orientation of the marine vessel 100. The luminous intensity of the navigation lights 6 is, for example, not less than 0.9 candela and less than 12 candela (for a trawler having a length of less than 50 meters, it is, for example, not less than 0.9 candela and less than 4.3 candela).

The mast light 61 is provided above a rear portion of a deck. Specifically, the mast light 61 is attached to a mast light mounting pole 71 provided at an upper portion of the vessel body 1. The mast light mounting pole 71 extends upward (in an upward-downward direction) from the rear portion of the deck. The mast light 61 is provided at the highest position among all the navigation lights 6. The central axis of the cylindrical mast light 61 is located coaxially with the central axis of the mast light mounting pole 71. The mast light mounting pole 71 is an example of a "navigation light mounting pole".

Figure 3:
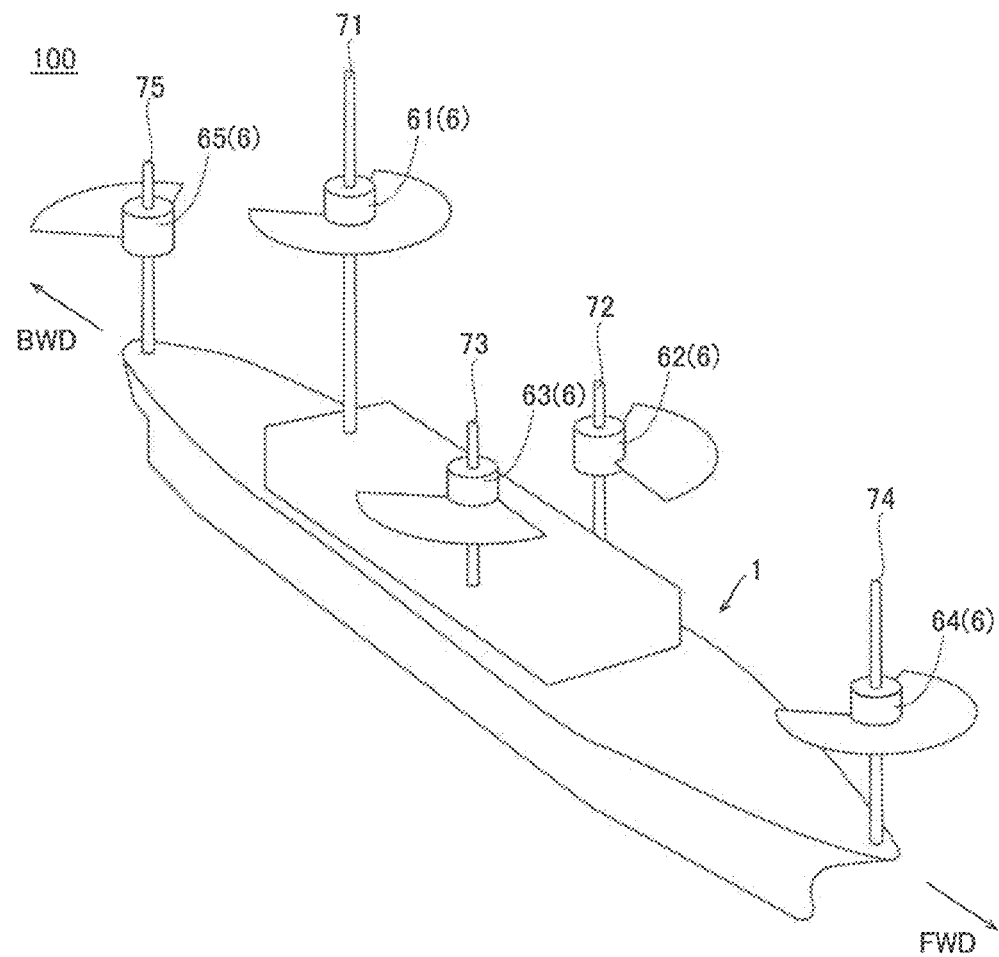
FIG. 3 is a schematic view illustrating navigation lights of the marine vessel according to the first preferred embodiment of the present invention.

As shown in FIG. 3, the port light 62 is attached to a port light mounting pole 72 provided on the left side of the vessel body 1. The starboard light 63 is attached to a starboard light mounting pole 73 provided on the right side of the vessel body 1. The stern light 65 is attached to a stern light mounting pole 75 provided on the stern 1b. The bow light 64 is attached to a bow light mounting pole 74 provided on the bow 1a.

Figure 4:
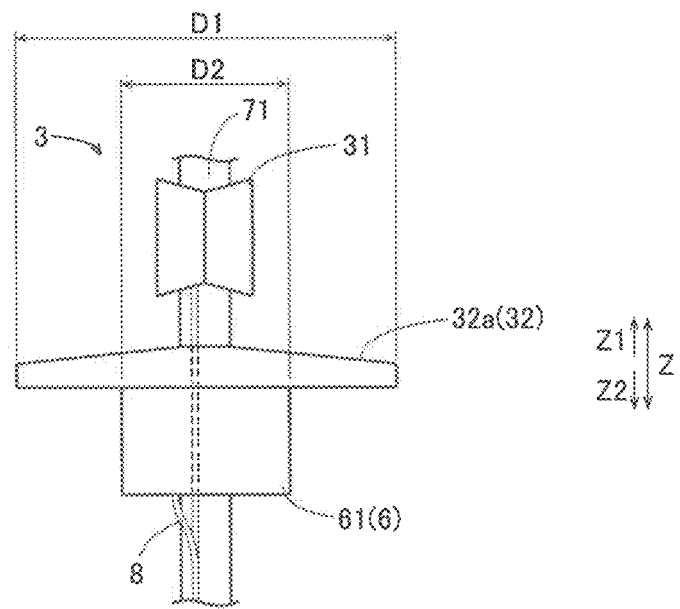
FIG. 4 is a side view showing a marine vessel imaging device of the marine vessel according to the first preferred embodiment of the present invention.

The marine vessel imaging device 3 shown in FIG. 4 supports the marine vessel operation of the marine vessel operator. For example, as shown in FIG. 2, the marine vessel imaging device 3 displays a captured image on a display 40 (see FIG. 2) when the marine vessel operator operates the marine vessel operation unit 5a (5b) (operates the marine vessel) while being located on the operation seat 4a (4b) so as to complement the marine vessel operator's field of view (blind spot).

The marine vessel imaging device 3 includes an all-around imager 31 and a light-shielding plate 32. The all-around imager 31 is an example of an "imager". The light-shielding plate 32 is an example of a "light shield".

The all-around imager 31 images the entire or substantially the entire circumference around the vessel body 1. Specifically, the all-around imager 31 includes, for example, a single omnidirectional camera (360-degree camera) that captures a moving image. The omnidirectional camera captures 360-degree panoramic photographs in all directions, upward, downward, leftward, and rightward directions, and 360-degree moving images.

The all-around imager 31 (marine vessel imaging device 3) is provided in the vicinity of or adjacent to the mast light (navigation light 6). Specifically, the all-around imager 31 is attached to the mast light mounting pole 71 above the light-shielding plate 32 such that an image captured by the all-around imager 31 does not include the light-shielding plate 32 (the light-shielding plate 32 does not appear in an imaging range of the all-around imager 31).

The all-around imager 31 is provided at a position that overlaps the light-shielding plate 32 and the mast light 61 in the upward-downward direction. Furthermore, the all-around imager 31 is provided at a position higher than the vicinity of the bow light 64 in the upward-downward direction.

As shown in FIG. 4, the light-shielding plate 32 is provided between the mast light 61 (navigation light 6) and the all-around imager 31. Thus, the light-shielding plate 32 blocks light from the mast light 61 to the all-around imager 31.

The light-shielding plate 32 is separate from the mast light 61. The light-shielding plate 32 contacts the mast light 61 from above and is spaced apart from the all-around imager 31. That is, the light-shielding plate 32 is provided closer to the mast light 61 than the all-around imager 31.

The light-shielding plate 32 is provided at a position that overlaps the all-around imager 31 and the mast light 61 in a plan view. Furthermore, the all-around imager 31 and the mast light 61 are provided inside the outer peripheral end of the light-shielding plate 32 in the plan view.

The light-shielding plate 32 is attached to the mast light mounting pole 71 above the mast light 61, similarly to the all-around imager 31.

The light-shielding plate 32 has a disk shape that extends horizontally around the mast light mounting pole 71. The central axis of the light-shielding plate 32 is located coaxially with the central axes of the mast light 61 and the mast light mounting pole 71. Note that the diameter D1 of the light-shielding plate 32 (in the plan view) is larger than the diameter D2 of the cylindrical mast light 61.

The upper surface 32a of the light-shielding plate 32 includes an inclined surface that is inclined downward toward the outer peripheral end of the upper surface 32a such that water does not accumulate thereon. Even when liquid adheres to the inclined upper surface 32a, the liquid is removed by flowing toward the outer peripheral end due to gravity.

The marine vessel 100 (see FIG. 1) includes power supply wiring 8 that supplies power to the mast light 61 (navigation light 6). A power supply source of the power supply wiring 8 is a battery (not shown) provided in the marine vessel 100. The power supply wiring 8 also supplies power to the all-around imager 31. The power supply wiring 8 is branched before the mast light 61, and electrically connects the battery to the mast light 61, and the all-around imager 31 so as to supply power to both the mast light 61 and the all-around imager 31.

According to the first preferred embodiment of the present invention, the following advantageous effects are achieved.

According to the first preferred embodiment of the present invention, with the structure described above, the light from the navigation light 6 toward the all-around imager 31 is blocked by the light-shielding plate 32, and thus the appearance of light from the navigation light 6 in the image captured by the all-around imager 31 is significantly reduced or prevented. Furthermore, the all-around imager 31 is provided in the vicinity of or adjacent to the navigation light 6, and thus power is also supplied to the all-around imager 31 by the wiring that supplies power to the navigation light 6. That is, the wiring is shared, and thus the structure (the structure of the wiring) that supplies power is simplified.

According to the first preferred embodiment of the present invention, the all-around imager 31 is provided at the position that overlaps the light-shielding plate 32 in the upward-downward direction. Accordingly, a space in which the all-around imager 31 and the light-shielding plate 32 are provided in the horizontal direction is reduced.

According to the first preferred embodiment of the present invention, the light-shielding plate 32 is provided at the position that overlaps the all-around imager 31 and the navigation light 6 in the plan view. Accordingly, a space in which the all-around imager 31, the light-shielding plate 32, and the navigation light 6 are provided in the horizontal direction is reduced. Furthermore, the navigation light 6 emits light in or substantially in the horizontal direction, and thus the all-around imager 31 and the navigation light 6 overlap each other in the plan view such that the appearance of light from the navigation light 6 in the image captured by the all-around imager 31 is significantly reduced or prevented.

According to the first preferred embodiment of the present invention, the marine vessel 100 further includes the mast light mounting pole 71 to which the navigation light 6 is attached and that extends in the upward-downward direction, and the all-around imager 31 and the light-shielding plate 32 are attached to the mast light mounting pole 71 above or below the navigation light 6. Accordingly, the all-around imager 31 and the navigation light 6 are attached to the common mast light mounting pole 71 such that the all-around imager 31 is easily provided in the vicinity of or adjacent to the navigation light 6.

According to the first preferred embodiment of the present invention, the navigation light mounting pole includes the mast light mounting pole 71, to which the mast light 61 is attached, provided at the upper portion of the vessel body 1, the light-shielding plate 32 is attached to the mast light mounting pole 71 above the mast light 61, and the all-around imager 31 is attached to the mast light mounting pole 71 above the mast light 61. Accordingly, the all-around imager 31 is attached to the mast light mounting pole 71 provided at the highest position of the marine vessel 100, and thus a wider range is imaged by the all-around imager 31.

According to the first preferred embodiment of the present invention, the all-around imager 31 is attached to the mast light mounting pole 71 above the light-shielding plate 32 such that the image captured by the all-around imager 31 does not include the light-shielding plate 32. Accordingly, an image of the surroundings of the marine vessel 100 to be imaged is reliably captured over a wider range without being obstructed by the light-shielding plate.

According to the first preferred embodiment of the present invention, the all-around imager 31 includes a single all-around imager 31 that images the entire or substantially the entire circumference around the vessel body 1. Accordingly, the structure of the device is simplified as compared with a case in which a plurality of all-around imagers 31 image the entire or substantially the entire circumference around the vessel body 1.

According to the first preferred embodiment of the present invention, the light-shielding plate 32 has a disk shape that extends in the horizontal direction around the mast light mounting pole 71. Accordingly, a distance from the navigation light 6 to the outer peripheral end of the light-shielding plate 32 is uniform, and thus the light-shielding plate 32 uniformly blocks light in any horizontal direction.

According to the first preferred embodiment of the present invention, in the plan view, the diameter D1 of the light-shielding plate 32 is larger than the diameter D2 of the navigation light 6. Accordingly, the light-shielding plate 32 and the navigation light 6 reliably overlap each other in the upward-downward direction, and thus light is more reliably blocked by the light-shielding plate 32.

According to the first preferred embodiment of the present invention, the marine vessel 100 further includes the power supply wiring 8 that supplies power to the navigation light 6, and the power supply wiring 8 also supplies power to the all-around imager 31. Accordingly, the power supply wiring 8 supplies power not only to the navigation light 6 but also to the all-around imager 31. Therefore, the structure (the structure of the wiring) that supplies power is simplified as compared with a case in which dedicated wiring that supplies power to the all-around imager 31 is provided.

According to the first preferred embodiment of the present invention, the light-shielding plate 32 and the navigation light 6 are separate from each other. Accordingly, the arrangement of the light-shielding plate 32 with respect to the navigation light 6 is adjusted.

According to the first preferred embodiment of the present invention, the upper surface 32a of the light-shielding plate 32 includes the inclined surface that is inclined downward toward the end of the upper surface 32a such that water does not accumulate thereon. Accordingly, adhesion of water to the all-around imager 31 that has accumulated on the upper surface 32a of the light-shielding plate 32 is significantly reduced or prevented.

According to the first preferred embodiment of the present invention, the light-shielding plate 32 is provided closer to the navigation light 6 than the all-around imager 31. Accordingly, the spreading of light emitted from the navigation light 6 toward the all-around imager 31 is effectively significantly reduced or prevented.

According to the first preferred embodiment of the present invention, the light-shielding plate 32 contacts the navigation light 6 and is spaced apart from the all-around imager 31. Accordingly, the spreading of light emitted from the navigation light 6 toward the all-around imager 31 is more effectively significantly reduced or prevented.

According to the first preferred embodiment of the present invention, the all-around imager 31 is provided at the position higher than the vicinity of the bow light 64. Accordingly, the all-around imager 31 is provided at a relatively high position, and thus a wide range is imaged by the all-around imager 31.

According to the first preferred embodiment of the present invention, the plate-shaped light-shielding plate 32 that blocks light is provided. Accordingly, the light from the navigation light 6 toward the all-around imager 31 is blocked by a simple structure.

Second Preferred Embodiment

The structure of a marine vessel 200 according to a second preferred embodiment of the present invention is now described with reference to FIGS. 5 and 6. In the second preferred embodiment, marine vessel imaging devices 230a and 230b are provided in the vicinity of or adjacent to a port light 62 and a starboard light 63, respectively, unlike the first preferred embodiment in which the marine vessel imaging device 3 is provided in the vicinity of or adjacent to the mast light 61. In the second preferred embodiment, the same or similar structures as those of the first preferred embodiment are denoted by the same reference numerals, and description thereof is omitted.

Figure 5:
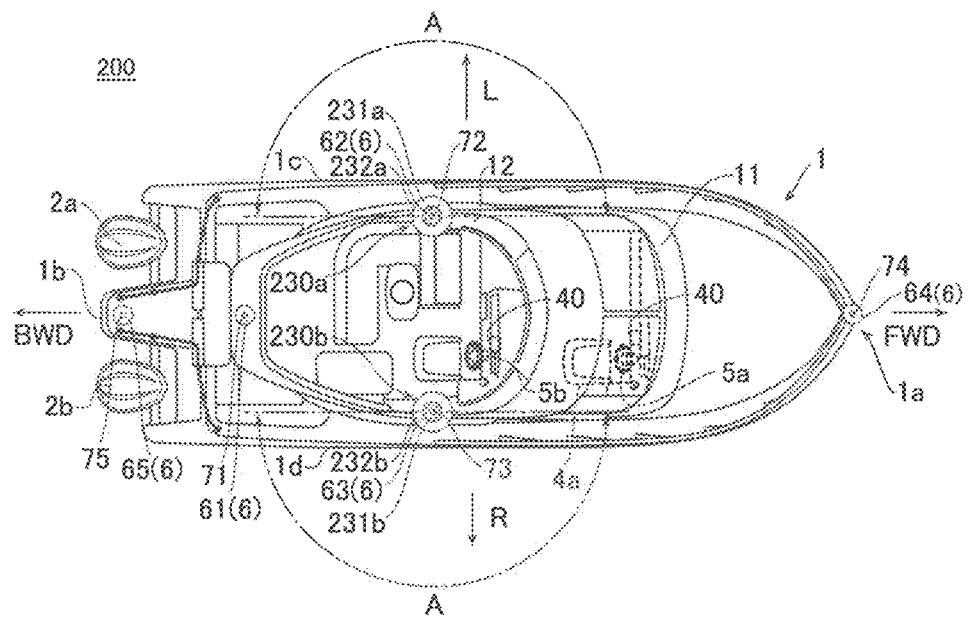
FIG. 5 is a plan view showing a marine vessel according to a second preferred embodiment of the present invention.

As shown in FIG. 5, the marine vessel 200 includes the marine vessel imaging devices 230a and 230b. The marine vessel imaging device 230a (first outer circumference imager 231a described below) is provided in the vicinity of or adjacent to the port light 62. The marine vessel imaging device 230b (second outer circumference imager 231b described below) is provided in the vicinity of or adjacent to the starboard light 63. The first outer circumference imager 231a and the second outer circumference imager 231b are examples of an "imager".

The marine vessel imaging device 230a includes the first outer circumference imager 231a and a light-shielding plate 232a. The marine vessel imaging device 230b includes the second outer circumference imager 231b and a light-shielding plate 232b. That is, the marine vessel 200 includes a plurality of outer circumference imagers (i.e., the first outer circumference imager 231a and the second outer circumference imager 231b) that image the surroundings of a vessel body 1.

Figure 6:
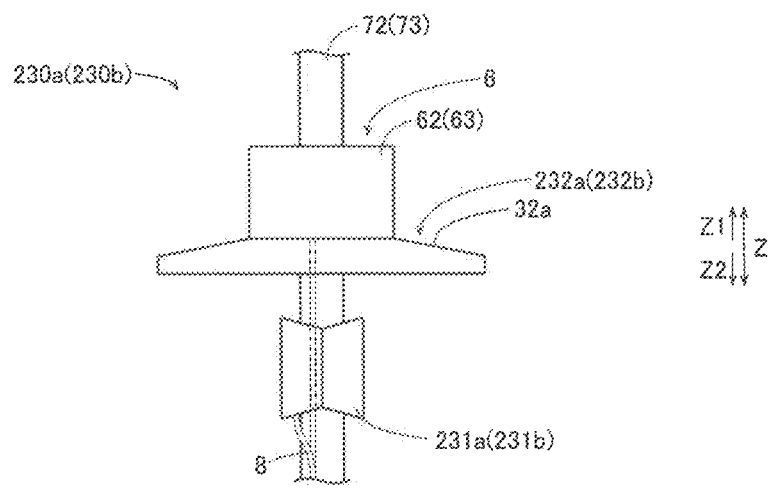
FIG. 6 is a side view showing a marine vessel imaging device of the marine vessel according to the second preferred embodiment of the present invention.

The plurality of outer circumference imagers (i.e., the first outer circumference imager 231a and the second outer circumference imager 231b) shown in FIG. 6 do not image the same target (image different ranges). Furthermore, the two first outer circumference imager 231a and second outer circumference imager 231b are disposed to capture images in horizontally opposite directions. The angle of view A of each of the first outer circumference imager 231a and the second outer circumference imager 231b is about 180 degrees in a horizontal direction. Therefore, in the horizontal direction, the sum of the angles of view A (see FIG. 5) of the plurality of (two) outer circumference imagers (the first outer circumference imager 231a and the second outer circumference imager 231b) is about 360 degrees.

The first outer circumference imager 231a (second outer circumference imager 231b) images half or substantially half the circumference around the vessel body 1. Specifically, the first outer circumference imager 231a (second outer circumference imager 231b) includes a single 180-degree camera that captures moving images. The 180-degree camera captures 180-degree panoramic photographs in all directions, upward, downward, leftward, and rightward directions, and 180-degree moving images.

The light-shielding plate 232a is attached to a port light mounting pole 72 below the port light 62. The first outer circumference imager 231a is attached to the port light mounting pole 72 below the light-shielding plate 232a. The light-shielding plate 232b is attached to a starboard light mounting pole 73 below the starboard light 63. The second outer circumference imager 231b is attached to the starboard light mounting pole 73 below the light-shielding plate 232b.

The first outer circumference imager 231a is provided in the vicinity of or adjacent to the port light 62 to capture an image in the rightward direction. The second outer circumference imager 231b is provided in the vicinity of or adjacent to the starboard light 63 to capture an image in the leftward direction.

The remaining structures of the second preferred embodiment are similar to those of the first preferred embodiment.

According to the second preferred embodiment of the present invention, the following advantageous effects are achieved.

According to the second preferred embodiment of the present invention, the light-shielding plates (232a, 232b) are attached below the port light 62 and the starboard light 63, and the first outer circumference imager 231a and the second outer circumference imager 231b are attached below the light-shielding plates 232a and 232b. Accordingly, images are captured without being obstructed by the light-shielding plates, and the images in the leftward and rightward directions in which blind spots of the imagers are likely to occur are reliably acquired.

According to the second preferred embodiment of the present invention, the marine vessel 200 includes the plurality of outer circumference imagers (i.e., the first outer circumference imager 231a and the second outer circumference imager 231b) that image the surroundings of the vessel body 1, the first outer circumference imager 231a and the second outer circumference imager 231b do not image the same target, and in the horizontal direction, the sum of the angles of view A of the first outer circumference imager 231a and the second outer circumference imager 231b is about 360 degrees. In general, when the surroundings of a marine vessel are imaged by a plurality of imagers and a composite image is created, it is necessary to perform calibration in order to match the overlapping of the captured images of the plurality of imagers. With the structure described above, the plurality of outer circumference imagers (i.e., the first outer circumference imager 231a and the second outer circumference imager 231b) capture images of about 360 degrees around the marine vessel 200 without overlapping each other, and thus a composite image of the entire or substantially the entire circumference around the marine vessel 200 is easily acquired without performing calibration.

According to the second preferred embodiment of the present invention, the angle of view of each of the first outer circumference imager 231a and the second outer circumference imager 231b is about 180 degrees in the horizontal direction, and the two outer circumference imagers (the first outer circumference imager 231a and the second outer circumference imager 231b) are provided to capture images in horizontally opposite directions. Accordingly, a blind spot of the first outer circumference imager 231a is reliably covered by the second outer circumference imager 231b.

According to the second preferred embodiment of the present invention, the two outer circumference imagers include the first outer circumference imager 231a and the second outer circumference imager 231b that captures an image in a horizontal direction opposite to that of the first outer circumference imager 231a, the first outer circumference imager 231a is provided in the vicinity of or adjacent to the port light 62 to capture an image in the leftward direction, and the second outer circumference imager 231b is provided in the vicinity of or adjacent to the starboard light 63 to capture an image in the rightward direction. Accordingly, when the first outer circumference imager 231a is provided in the vicinity of or adjacent to the port light 62 and the second outer circumference imager 231b is provided in the vicinity of or adjacent to the starboard light 63, the occurrence of blind spots of the marine vessel 200 in the leftward direction and the rightward direction is significantly reduced or prevented. When the first outer circumference imager 231a is provided in the vicinity of or adjacent to a bow light 64 and the second outer circumference imager 231b is provided in the vicinity of or adjacent to a stern light 65, the occurrence of blind spots of the marine vessel 200 in a forward direction and a rearward direction is significantly reduced or prevented.

The remaining advantageous effects of the second preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine vessel preferably includes outboard motors in each of the first and second preferred embodiments described above, the present invention is not restricted to this. The marine vessel may alternatively include inboard motors or inboard/outboard motors, or the marine vessel may alternatively include jet propulsion devices.

While the marine vessel imaging devices, the port light, and the starboard light are preferably indirectly attached to the vessel body via the navigation light mounting poles in the second preferred embodiment described above, the present invention is not restricted to this. In the present invention, the marine vessel imaging devices, the port light, and the starboard light may alternatively be directly attached to the vessel body, for example.

While the imagers are preferably provided in the vicinity of or adjacent to the port light and the starboard light in the second preferred embodiment described above, the present invention is not restricted to this. In the present invention, the imagers may alternatively be provided in the vicinity of or adjacent to the bow light and the stern light, for example.

While one imager is preferably provided in the first preferred embodiment described above, and two imagers are preferably provided in the second preferred embodiment described above, the present invention is not restricted to this. In the present invention, three or more imagers may alternatively be provided.

While the light-shielding plate(s) preferably has a disk shape in each of the first and second preferred embodiments described above, the present invention is not restricted to this. In the present invention, the light-shielding plate(s) may alternatively have a shape other than the disk shape such as a rectangular plate shape. In the preferred embodiments, the light-shielding plate(s) is used as a light shield(s) that significantly reduces or prevents the influence of the navigation light on the imager(s), but the light shield(s) is not necessarily limited to the light-shielding plate(s). For example, a light-shielding cover(s) or a light-shielding lens(es) may alternatively be used as the light shield(s) instead of the light-shielding plate(s).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:
   a vessel body including a navigation light;
   an imager provided in a vicinity of or adjacent to the navigation light; and
   a light shield arranged between the navigation light and the imager, and at a position that blocks light from the navigation light to the imager; wherein
   the imager and the light shield are arranged above or below the navigation light; and
   the light shield includes a plate-shaped light-shielding plate without depressions, and the light shield extends in a horizontal direction and is arranged between an end of the imager facing the light shield and an end of the navigation light facing the light shield in an upward-downward direction.

2. The marine vessel according to claim 1, wherein the imager is provided at a position that overlaps the light shield in an upward-downward direction.

3. The marine vessel according to claim 2, wherein the light shield is provided at a position that overlaps the imager and the navigation light in a plan view.

4. The marine vessel according to claim 2, further comprising:
a navigation light mounting pole to which the navigation light is attached, the navigation light mounting pole extending in the upward-downward direction; wherein
the imager and the light shield are attached to the navigation light mounting pole above or below the navigation light.

5. The marine vessel according to claim 4, wherein
the navigation light mounting pole includes a mast light mounting pole to which a mast light of the navigation light is attached, the mast light mounting pole being provided at an upper portion of the vessel body;
the light shield is attached to the mast light mounting pole above the mast light; and
the imager is attached to the mast light mounting pole above the mast light.

6. The marine vessel according to claim 5, wherein the imager is attached to the mast light mounting pole above the light shield such that an image captured by the imager does not include the light shield.

7. The marine vessel according to claim 4, wherein the imager includes a single all-around imager that images an entire or substantially an entire circumference around the vessel body.

8. The marine vessel according to claim 4, wherein the light shield has a disk shape that extends in a horizontal direction around the navigation light mounting pole.

9. The marine vessel according to claim 8, wherein, in a plan view, a diameter of the light shield is larger than a diameter of the navigation light.

10. The marine vessel according to claim 2, wherein
the light shield is attached below a port light and a starboard light of the navigation light; and
the imager is attached below the light shield.

11. The marine vessel according to claim 2, wherein
the imager includes a plurality of outer circumference imagers that image surroundings of the vessel body;
the plurality of outer circumference imagers do not image a same target; and
in a horizontal direction, a sum of angles of views of the plurality of outer circumference imagers is about 360 degrees.

12. The marine vessel according to claim 11, wherein
the imager includes two outer circumference imagers;
an angle of view of each of the two outer circumference imagers is about 180 degrees in the horizontal direction; and
the two outer circumference imagers are provided to capture images in horizontally opposite directions.

13. The marine vessel according to claim 12, wherein
the two outer circumference imagers include a first outer circumference imager and a second outer circumference imager that captures an image in the horizontal direction opposite to that of the first outer circumference imager;
the first outer circumference imager is provided in a vicinity of or adjacent to a port light of the navigation light to capture an image in a leftward direction, or is provided in a vicinity of or adjacent to a bow light of the navigation light to capture an image in a forward direction; and
the second outer circumference imager is provided in a vicinity of or adjacent to a starboard light of the navigation light to capture an image in a rightward direction when the first outer circumference imager is provided in the vicinity of or adjacent to the port light, and is provided in a vicinity of or adjacent to a stern light of the navigation light to capture an image in a rearward direction when the first outer circumference imager is provided in the vicinity of or adjacent to the bow light.

14. The marine vessel according to claim 1, further comprising:
power supply wiring that supplies power to the navigation light; wherein
the power supply wiring also supplies power to the imager.

15. The marine vessel according to claim 1, wherein the light shield and the navigation light are separate from each other.

16. The marine vessel according to claim 1, wherein an upper surface of the light shield includes an inclined surface that is inclined downward toward an end of the upper surface such that water does not accumulate thereon.

17. The marine vessel according to claim 1, wherein the light shield is closer to the navigation light than the imager.

18. The marine vessel according to claim 17, wherein the light shield contacts the navigation light and is spaced apart from the imager.

19. The marine vessel according to claim 1, wherein the imager is provided at a position higher than a vicinity of a bow light of the navigation light.

20. A marine vessel imaging device comprising:
an imager provided in a vicinity of or adjacent to a navigation light provided in a vessel body; and
a light shield arranged between the navigation light and the imager, and at a position that blocks light from the navigation light to the imager; wherein
the imager and the light shield are arranged above or below the navigation light; and
the light shield includes a plate-shaped light-shielding plate without depressions, and the light shield extends in a horizontal direction and is arranged between an end of the imager facing the light shield and an end of the navigation light facing the light shield in an upward-downward direction.

* * * * *